United States Patent [19]

Reichmuth

[11] Patent Number: 4,925,296

[45] Date of Patent: May 15, 1990

[54] METHOD OF, AND APPARATUS FOR MEASURING THE FLOW VELOCITY IN WIND TUNNELS

[76] Inventor: Johannes Reichmuth, Kastanienweg 3, 3400 Göttingen, Fed. Rep. of Germany

[21] Appl. No.: 239,594

[22] Filed: Sep. 1, 1988

[30] Foreign Application Priority Data

Sep. 4, 1987 [DE] Fed. Rep. of Germany ....... 3729648

[51] Int. Cl.$^5$ .......................... G01P 3/36; G01P 5/18
[52] U.S. Cl. .................................. 356/28; 73/861.05; 356/338; 364/822
[58] Field of Search ................................ 356/338–341, 356/343, 28, 28.5; 73/861.05, 861.06; 364/819, 822, 827

[56] References Cited

U.S. PATENT DOCUMENTS

| | | | |
|---|---|---|---|
| 4,162,509 | 7/1979 | Robertson | 356/28 |
| 4,272,189 | 6/1981 | Bailey et al. | 356/28 |
| 4,396,943 | 8/1983 | Lord et al. | 356/28 X |
| 4,518,256 | 5/1985 | Schwartz | 356/5 |
| 4,695,973 | 9/1987 | Yu | 364/822 |
| 4,733,962 | 3/1988 | Brendemuehl | 356/28 |

Primary Examiner—Thomas H. Tarcza
Assistant Examiner—Linda J. Wallace
Attorney, Agent, or Firm—Thomas & Kennedy

[57] ABSTRACT

A method of measuring the flow velocity in wind tunnels is indicated, in which a path covered by particles located in a flow is employed as a measure of the flow velocity. In a pre-determined time interval, the particles are illuminated twice in a plane by means of a light, and a light reflected by the particles is recorded and transmitted in the form of an image. The image is transilluminated by a second coherent light beam focused in a first Fourier plane, and in this way a first Fourier-transformed image is produced, which is recorded in its turn. The image and the first Fourier-transformed image (23) are displayed immediately. The first Fourier-transformed image (23) is transilluminated by a third coherent light beam (19), and consequently a second Fourier-transformed image (34) is produced in a second Fourier plane (33) in an optical manner. The second Fourier-transformed image (34) is recorded and immediately further processed.

14 Claims, 1 Drawing Sheet

METHOD OF, AND APPARATUS FOR MEASURING THE FLOW VELOCITY IN WIND TUNNELS

FIELD OF THE INVENTION

The invention proceeds from a method of measuring the flow velocity in wind tunnels, in which a path covered by particles located in a flow is employed as a measure of the flow velocity, in that the particles are illuminated twice in a pre-determined time interval by means of a light beam, and a light reflected by the particles is recorded and reproduced in the form of an image, and the image is transilluminated by a second coherent light beam focused in a first Fourier plane, so that a first Fourier-transformed image is produced, which is in turn recorded. The term "transilluminated" as used herein refers to the illumination of displayed images by a beam of coherent light in the production of Fourier-transformations of such images. At the same time, an apparatus is indicated for carrying out the method.

BACKGROUND OF THE INVENTION

With such a known method, particles are introduced into the flow to be investigated, the flow is therefore seeded. With the correct choice of the particles, especially of their diameter, the former largely follow the flow. If therefore, the path of a particle is traced, this yields both the velocity and also the direction and orientation of the flow vector.

Such a method of the type mentioned at the beginning is known from the article "Particle Imaging Velocimetry in a Low Turbulent Wind Tunnel and other Flow Facilities" by J. Kompenhans and J. Reichmuth, AGARD Conference Proceedings No. 399, "Advanced Instrumentation for Aero Engine Components". The particles are illuminated in a plane by means of a light beam, the illumination taking place in the form of a light flash. After a pre-determined time interval, a renewed illumination of the particles takes place. The light reflected by the particles is retained on an image.

In this connection, the image is illuminated twice by the reflected light of the first and second light flash, so that each particle is imaged twice on the one image. To determine the velocity, it is now necessary to determine the images of each particle which belong together. This is achieved in that the image developed in the form of a slide is transilluminated by the second coherent light beam. This light beam is focused in the Fourier plane. Consequently, the first Fourier-transformed image is imaged in the Fourier plane. This first Fourier-transformed image has a strip pattern, the separation of the strips being inversely proportional to the velocity. The velocity vector is perpendicular to the strips. The further evaluation is undertaken by a computer, to which is fed the first Fourier-transformed image. The second Fourier-transformed image is computed in the computer. This second Fourier-transformed image has three points, the connecting line between the middle point and one of the two other points yielding the flow vector. After these steps have been carried out, the flow vector is then known at one point of the flow field. It is disadvantageous that this method is very time-consuming: The light reflected by the particles is retained on a film, which must first be developed, in order to be able to process the flow information further. Only after this first Fourier-transformed image is developed can it be fed into the computer and then evaluated by the latter.

The evaluation in the computer is also very time-consuming. Normal times for the evaluation of a measured point lie in the region of about one minute. In addition to the costs arising for the film material and the development, as well as for the acquisition and maintenance of the computer, it is especially disadvantageous that a continuous monitoring of the flow is not possible. In addition, because of different development and different film material the slides are often of different quality, and are in part not suitable for the subsequent evaluation. It is then necessary to prepare a new slide, so that the total time required can be greatly lengthened. However, for some investigations, in which the flow is not reproducible, this is not possible, so that the method cannot be applied for such flow investigations. Even for the case in which the flow is reproducible, the method is not suitable for industrial measurements, because the evaluation is too tedious, and it is necessary, as a rule, to repeat some recordings, so that the possibility must exist to reproduce the flow anew after several days, the wind tunnel must therefore be available for several days. However, for reasons of cost this is not possible.

SUMMARY OF THE INVENTION

It is the object of the invention further to develop a method of, and apparatus for measuring the flow velocity in wind tunnels of the type described at the beginning in such a way that a quasi-continuous flow monitoring is possible.

This is achieved according to the invention in that the image and the first Fourier-transformed image are displayed immediately, that the first Fourier-transformed image is transilluminated by a third coherent light beam, and that a second Fourier-transformed image is thus produced optically in a second Fourier plane, and in that the second Fourier-transformed image is recorded and immediately further processed. The particles in the flow are therefore illuminated by the first light beam in a pre-determined time interval and in a definite plane. The light reflected by the particles is recorded and immediately reproduced. The time for the development of the slide is eliminated. The second light beam transilluminates the image and projects the first Fourier-transformed image in the first Fourier plane. The former is recorded and immediately re-imaged. The third light beam now transilluminates the first Fourier-transformed image, and images the second Fourier-transformed image on the second Fourier plane. The second Fourier-transformed image is therefore produced in an optical manner. This second Fourier-transformed image is recorded and fed immediately to a computer, which determines the flow vector in fractions of a second. No time-consuming development is therefore required here. Equally advantageously, the time-consuming computation of the second Fourier-transformed image is eliminated. The evaluation is carried out continuously, that is without any interruption, so that the flow can be monitored quasi-isochronously. The further advantage ensues that errors in the system can immediatley be recognized and eliminated. An expensive and time-consuming repetition of the measurement after a lengthy period of time is not required. The need to intervene arises not only from errors in the measurement apparatus, but can equally be occasioned by a change in the flow conditions. For example, if measurements are being made in a region with low turbulence a different setting is required than in the region of high turbulence. The setting can therefore be adjusted to the conditions obtaining at any one time. Consequently, there also ensues a substantially improved quality of the image, and also of the Fourier-transformed images. This has the advantage, on the one hand, that the measurement error is small, and, on the other hand, that measurements can also be carried out under flow conditions for which the method known in the prior art can no longer be applied.

The particles can be illuminated with a laser beam. The application of a laser beam offers the advantage that the light beam possesses high energy, and that the light reflected by the particles is therefore also sufficient for recording under unfavorable conditions. Moreover, it is particularly simple to use the laser beam to illuminate only a single plane.

The image of the first recording unit can be stored temporarily. The possibility therefore arises that further, possibly more precise evaluations can be carried out later. It is therefore always possible to fall back on the original image, which has not yet been subjected to further processing. This also has the advantage that in the event of an error in the subsequently connected equipment, namely, for example, in the second or third recording unit, a later evaluation is possible without it being necessary to conduct the experiment once again.

Typical of the apparatus for carrying out the method is that at least one second light source and one second optical system are provided, wherein a third recording unit and a second output unit are set up, and wherein the first recording unit is connected directly to the first output unit, the second recording unit directly to the second output unit, and the third recording unit directly to the computer. In this connection, the first and second output units have an LCD screen in each case, it being possible for a digitization unit and an LCD controller to be connected before the LCD screen concerned. The application of an LCD screen as output unit ideally fulfills the conditions obtaining here. The screen can be transilluminated, so that it is possible in each case to produce in an optical manner the Fourier-transformed image of the image imaged on the LCD screen. Moreover, the LCD screen offers sufficient resolution and contrast. The digitization unit and the LCD controller serve to prepare the signal of the recording unit for the LCD screen. It is self-evident that any spatially controllable optical modulator can be employed as out-put unit.

Reflecting mirrors for splitting the light beam of the second light source can advantageously be provided in the second and third coherent light beam. In this connection, one laser each can be provided as first and second light source. In this way, it is ensured that the light beam is coherent, and so the interference pattern concerned can be produced in the appropriate Fourier plane.

The first, second and third recording unit can have a video camera, it being possible for a video recorder to be connected after the first video camera. In this connection, the application of the video camera has proved to be especially economical and dependable. The storage of the images made with the video camera takes place advantageously in a video recorder connected after the video camera.

BRIEF DESCRIPTION OF THE DRAWINGS

The invention is further described with the aid of a preferred illustrative embodiment.

DETAILED DESCRIPTION

Figure 1:
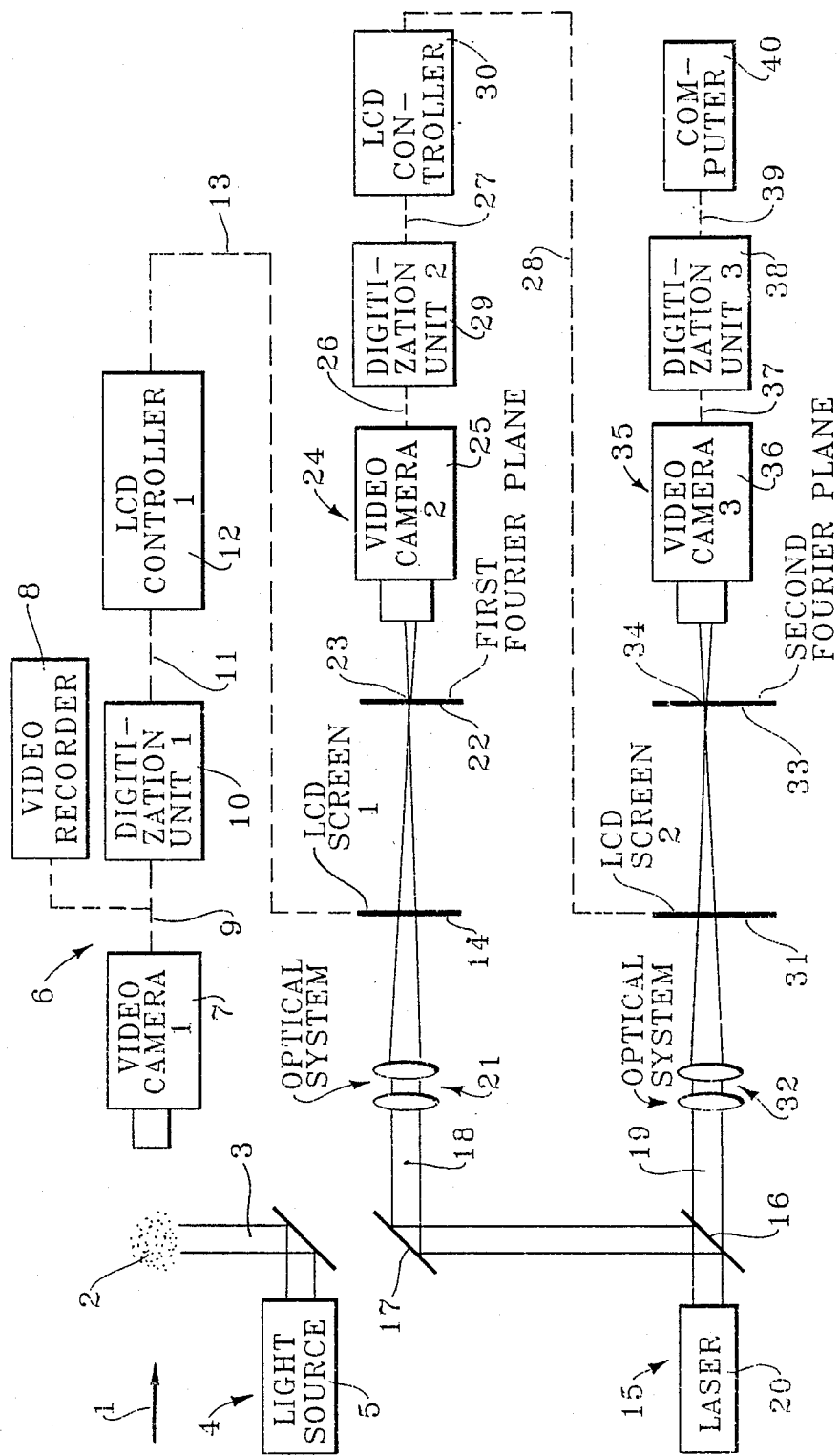
FIG. 1 shows a schematic representation of the method and of the apparatus.

Particles 2 are moved along in a flow 1. These particles 2 are conveyed by the flow 1 in an almost slip-free manner. A plane perpendicular to the plane of the drawing is illuminated with a light beam 3. The light beam 3 is produced by a first light source 4. The first light source 4 is constructed as laser 5. The illumination takes place in the form of a flash, being made twice in a predetermined period of time. The light reflected by the particles 2 is recorded by a first recording unit 6, which has a video camera 7 and a video recorder 8. Via an electrical connection 9, the video camera 7 is connected to a first digitization unit 10, and the latter is connected via an electrical connection 11 to an LCD controller 12. Via an electrical connection 13, the LCD controller 12 transmits its signals to a first LCD screen 14. The first digitization unit 10, the LCD controller 12 and the LCD screen 14 represent the first output unit 10, 12, 14. Reflecting mirrors 16 and 17 are arranged in the light beam of a second light source 15, so that the light beam of the second light source 15 is split into a second light beam 18 and a third light beam 19. A second laser 20 is provided as second light source 15, so that the second light beam 18 and third light beam 19 are coherent. A first optical system 21 is arranged in the second light beam 18. The first optical system 21 focuses the second light beam 18 in a first Fourier plane 22. The LCD screen 14 is arranged before the first Fourier plane 22, and therefore between the first optical system 21 and the first Fourier plane 22. The second light beam 18 transilluminates the LCD screen 14, so that a first Fourier-transformed image 23 is imaged in the first Fourier plane 22. The first Fourier-transformed image 23 is recorded by a second recording unit 24, which is likewise constructed as video camera 25. Via electrical connections 26, 27 and 28, the output signal of the video camera 25 is fed to a second digitization unit 29, a second LCD controller 30 and a second LCD screen 31. In this connection, the second digitization unit 29, the second LCD controller 30 and the second LCD screen 31 form the second output unit 29, 30, 31. The third light beam 19, which is focused in a second Fourier plane 33 by a second optical system 32, transilluminates the second LCD screen 31, so that a second Fourier-transformed image 34 arises in the second Fourier plane 33. This second Fourier-transformed image 34 is recorded by a third recording unit 35, which contains a video camera 36. The output signal of the video camera 36 is placed at the disposal of a third digitization unit 38 via an electrical connection 37, and at the disposal of a computer 40 via an electrical connection 39.

The mode of operation of the method is explained in the following. The particles 2 are introduced into the flow 1. The dimensions of the particles 2 are such that they can be moved along in a quasi-slip-free manner by the flow 1. The path covered by each particle 2 then yields the flow vector of the flow 1. In order to be able to obtain or compute this path, the particles 2 are illuminated twice with the light beam 3 in the form of a flash. The particles 2 partially reflect the light beam 3. The reflected light is recorded by the video camera 7. The result is therefore a recording in which each of the particles 2 is imaged twice. The flow velocity of the flow 1 follows from the path covered by the individual particles 2 to the time difference between the two flashes of the light beam 3. The direction and orientation of the flow 1 are obtained from the connecting line of each of the twice-recorded particles 2. It is expedient for this evaluation to take place in an optical manner. To this end, the output signal of the video camera 7 is fed to the first digitization unit 10. The signal digitized in the digitization unit 10 is reprocessed by the LCD controller 12, so that it is displayed on the LCD screen 14. The LCD screen 14 is transilluminated by the second coherent light beam 18, which is focused in the first Fourier plane 22 by means of the optical system 21, so that the first Fourier-transformed image 23 is imaged in the first Fourier plane 22. The first Fourier-transformed image 23 appears as a strip pattern, the separations of the strips being inversely proportional to the velocity. A further simplification of the evaluation follows from a second optical Fourier transformation, that is from the recording of the first Fourier-transformed image 23 with the second video camera 25 and further processing of the signal of the second video camera 25 by means of the second digitization unit 29 and of the second LCD controller 30, as well as from representing the first Fourier-transformed image 23 on the second LCD screen 31, which is transilluminated by the third coherent light beam 19 and focused in the second Fourier plane 33. The second Fourier-transformed image 34 imaged in the second Fourier plane 33 now has three points, two points being in each case symmetrically arranged about the middle point. The distance between the middle point and one of the two outer points is proportional to the velocity, the connecting line yields the direction and orientation of the flow vector of the flow 1. The second Fourier-transformed image 34 is placed at the disposal of the computer 40 via the video camera 36 and the third digitization unit 38. The computer 40 now computes the flow vector of the flow 1 from the separation, and also from the position, of the points of the second Fourier-transformed image 34. The computation is simple, and takes place in fractions of a second.

List of Reference Numerals

1 Flow
2 Particles
3 Light beam
4 First light source
5 Laser
6 First recording unit
7 Video camera
8 Video recorder
9 Electrical connection
10 First digitization unit
11 Electrical connection
12 LCD controller
13 Electrical connection
14 LCD screen
15 Second light source
16 Reflecting mirror
17 Reflecting mirror
18 Second light beam
19 Third light beam
20 Laser
21 First optical system
22 First Fourier plane
23 First Fourier-transformed image
24 Second recording unit
25 Video camera
26 Electrical connection
27 Electrical connection
28 Electrical connection
29 Second digitization unit
30 Second LCD controller
31 Second LCD screen
32 Second optical system
33 Second Fourier plane
34 Second Fourier-transformed image
35 Third recording unit
36 Video camera
37 Electrical connection
38 Third digitization unit
39 Electrical connection
40 Computer

I claim:

1. Method of measuring the flow velocity of a fluid in wind tunnels, in which a path travelled by particles located in the flow of fluid is employed as a measure of the flow velocity, with said method comprising the steps of illuminating the particles at least twice in a pre-determined time interval by means of a light beam; recording the light reflected by the particles and reproducing the light in the form of an image; transilluminating the image with a first coherent light beam focused in a first Fourier plane to produce a first Fourier-transformed image; displaying the first Fourier-transformed image; transilluminating the displayed first Fourier-transformed image with a second coherent light beam focused in a second Fourier plane to produce a second Fourier-transformed image; recording the second Fourier-transformed image and processing the recorded second Fourier-transformed image to extract flow velocity information therefrom.

2. The method as claimed in claim 1 and wherein the step of illuminating the particles includes exposing the particles to laser light.

3. The method as claimed in claim 1 and further including the step of storing the image of the illuminated particles.

4. An apparatus for measuring the flow velocity of fluids in wind tunnels wherein paths traversed by particles in the fluid flow are employed as a measure of fluid flow velocity, said apparatus comprising:
 a light source adapted to illuminate the particles at least twice in a predetermined time interval;
 means for reproducing light reflected by the particles as an image;
 means for transilluminating the image of the particles with a first coherent light beam focused in a first Fourier plane to produce a first Fourier-transformed image;
 means for displaying the first Fourier-transformed image;
 means for transilluminating the displayed first Fourier-transformed image with a second coherent light beam focused in a second Fourier plane to produce a second Fourier-transformed image; and
 means for processing the second Fourier-transformed image to extract flow velocity information therefrom.

5. The apparatus of claim 4 wherein said means for reproducing light reflected by the particles as an image includes a video camera arranged to view the illuminated particles, an LCD screen and electronic means operatively coupled between said video camera and said LCD screen for displaying the image produced by said camera on said LCD screen.

6. The apparatus of claim 5 wherein said electronic means comprises a digitization unit and an LCD controller.

7. The apparatus of claim 5 wherein said LCD screen is disposed in the path of said first coherent light beam.

8. The apparatus of claim 4 wherein said means for transilluminating the image of the particles with a first coherent light beam includes a laser for producing a coherent light beam and an optical system constructed and arranged to focus the coherent light beam in the first Fourier plane.

9. The apparatus of claim 4 wherein said means for displaying the first Fourier-transformed image includes a video camera arranged to view the first Fourier-transformed image, an LCD screen and electronic means operatively coupled between said video camera and said LCD screen for displaying the image produced by said video camera on said LCD screen.

10. The apparatus of claim 9 wherein said electronic means comprises a digitization unit and an LCD controller.

11. The apparatus of claim 9 wherein said LCD screen is disposed the path of said second coherent light beam.

12. The apparatus of claim 4 wherein said means for transilluminating the first Fourier-transformed image includes a laser for producing a coherent light beam and an optical system constructed and arranged to focus the coherent light beam in the second Fourier plane.

13. The apparatus of claim 4 wherein said means for processing the second Fourier-transformed image comprises a video camera arranged to view the second Fourier-transformed image and a computer operatively coupled to said video camera and configured to process image signals produced thereby.

14. an apparatus for measuring the flow velocity of fluids in wind tunnels wherein paths traversed by particles in the flow of fluids are employed as a measure of flow velocity, said apparatus comprising:
   a light source adapted to illuminate the particles at least twice in a predetermined time interval;
   a first video camera arranged to view the illuminated particles;
   a first coherent light beam focused in a first Fourier plane;
   a second coherent light beam focused in a second Fourier plane;
   a second video camera arranged to view images produced in the first Fourier plane;
   a third video camera arranged to view images produced in the second Fourier plane;
   a first LCD screen disposed in the path of said first coherent light beam;
   a second LCD screen disposed in the path of said second coherent light beam;
   first electronic means coupled to display images produced by said fist video camera on said first LCD screen;
   second electronic means coupled to display images produced by said second video camera on said second LCD screen; and
   computer means coupled to said third video camera for processing video images produced thereby to extract flow velocity information therefrom,
   whereby a first Fourier-transformed image of the illuminated particles is formed in the first Fourier plane and a second Fourier-transformed image of the first Fourier-transformed image is formed in the second Fourier plane, the configuration of the second Fourier-transformed image being analyzable by the computer means to extract flow velocity information therefrom.

* * * * *